United States Patent
Cordes et al.

(10) Patent No.: US 11,349,790 B2
(45) Date of Patent: May 31, 2022

(54) SYSTEM, METHOD AND COMPUTER PROGRAM PRODUCT TO EXTRACT INFORMATION FROM EMAIL COMMUNICATIONS

(71) Applicant: International Business Machines Corporation, Armonk, NY (US)

(72) Inventors: Steven Cordes, Yorktown Heights, NY (US); Debra Leach Riell, Chicago, IL (US); Debra A. Loussedes, Clinton Corners, NY (US); Patrick Varekamp, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/578,776

(22) Filed: Dec. 22, 2014

(65) Prior Publication Data
US 2016/0182417 A1    Jun. 23, 2016

(51) Int. Cl.
*G06F 15/16* (2006.01)
*H04L 51/08* (2022.01)

(52) U.S. Cl.
CPC .................... *H04L 51/08* (2013.01)

(58) Field of Classification Search
CPC ......... H04L 51/08; H04L 51/22; H04L 51/24; H04L 51/26; H04L 51/28; H04L 51/30
USPC ........................................................ 709/206
See application file for complete search history.

(56) References Cited

U.S. PATENT DOCUMENTS

| | | |
|---|---|---|
| 7,305,441 B2 | 12/2007 | Mathewson, II et al. |
| 7,359,936 B2 | 4/2008 | Gruen et al. |
| 7,603,420 B2 | 10/2009 | Doan et al. |
| 2003/0074419 A1* | 4/2003 | VanderDrift .......... G06F 16/289 709/218 |
| 2003/0097361 A1* | 5/2003 | Huang .................... H04L 51/14 |
| 2003/0167167 A1 | 9/2003 | Gong |
| 2007/0156830 A1 | 7/2007 | Petry et al. |
| 2007/0168430 A1 | 7/2007 | Brun et al. |

(Continued)

FOREIGN PATENT DOCUMENTS

| | | | | |
|---|---|---|---|---|
| CA | 2834522 A1 * | 5/2014 | ......... | H04L 43/0817 |
| WO | WO-2009117835 A1 * | 10/2009 | ........... | G06F 16/353 |
| WO | WO-2014120582 A1 * | 8/2014 | ............. | H04L 51/28 |

OTHER PUBLICATIONS

Email Grouping and Summarization: An Unsupervised Learning Technique Taiwo Ayodele;Shikun Zhou;Rinat Khusainov 2009 WRI World Congress on Computer Science and Information Engineering (Year: 2009).*

(Continued)

*Primary Examiner* — Oscar A Louie
*Assistant Examiner* — Oluwatosin M Gidado
(74) *Attorney, Agent, or Firm* — Harrington & Smith (57) ABSTRACT

A method includes storing as communications data at least a portion of received electronic communications, such as emails, that are of interest to user; processing the stored communications data to identify at least one action item that pertains to the user; storing results of the processing including text descriptive of the at least one identified action item in a results repository; and outputting stored results in the results repository to a user device for review by the user. Also disclosed is a computer program product and a system that are configured to implement the method.

20 Claims, 3 Drawing Sheets

(56) References Cited

U.S. PATENT DOCUMENTS

| | | | |
|---|---|---|---|
| 2007/0180060 A1 | 8/2007 | Patel et al. | |
| 2009/0030933 A1* | 1/2009 | Brezina | H04L 67/22 |
| 2009/0254476 A1* | 10/2009 | Sharma | G06Q 20/10 705/39 |
| 2010/0037146 A1* | 2/2010 | Belsky | G06Q 10/06 715/744 |
| 2010/0121962 A1 | 5/2010 | Scott et al. | |
| 2011/0208816 A1* | 8/2011 | Chavez | G06Q 10/107 709/206 |
| 2011/0276590 A1* | 11/2011 | Hayes | G06Q 10/107 707/769 |
| 2011/0289422 A1* | 11/2011 | Spivack | G06F 16/951 715/739 |
| 2012/0197724 A1* | 8/2012 | Kendall | G06Q 30/0261 705/14.58 |
| 2013/0041968 A1 | 2/2013 | Cohen et al. | |
| 2013/0167210 A1* | 6/2013 | Chu | H04L 9/083 726/6 |
| 2014/0143666 A1* | 5/2014 | Kennedy | G06F 1/1686 715/705 |
| 2014/0280174 A1* | 9/2014 | Bitan | G06F 17/30994 707/740 |
| 2014/0343990 A1* | 11/2014 | Photowat | G06Q 30/0252 705/7.17 |
| 2015/0035686 A1* | 2/2015 | Frish | G08G 1/07 340/907 |
| 2015/0070188 A1* | 3/2015 | Aramburu | A01G 25/167 340/870.02 |
| 2015/0074202 A1* | 3/2015 | VanBlon | H04L 51/18 709/206 |
| 2015/0149930 A1* | 5/2015 | Walkin | G06F 3/04883 715/753 |
| 2015/0154524 A1* | 6/2015 | Borodow | G06Q 10/06313 705/7.23 |
| 2015/0294220 A1* | 10/2015 | Oreif | G06N 5/04 706/12 |
| 2015/0350856 A1* | 12/2015 | Circosta | H04W 4/14 455/466 |
| 2016/0026977 A1* | 1/2016 | Umapathy | G06Q 10/1093 705/7.18 |
| 2017/0138736 A1* | 5/2017 | Simon | G01C 21/00 |

OTHER PUBLICATIONS

Exploiting Personal and Social Network Context for Event Annotation Bageshree Shevade;Hari Sundaram;Lexing Xie 2007 IEEE International Conference on Multimedia and Expo (Year: 2007).*

Email Social Network Extraction and Search Michal Laclavik;Stefan Dlugolinsky;Marcel Kvassay;Ladislav Hluchy 2011 IEEE/WIC/ACM International Conferences on Web Intelligence and Intelligent Agent Technology Year: 2011 | vol. 3 | Conference Paper | Publisher: IEEE (Year: 2011).*

IBM Inventors; Ttl: Using mail rules to configure e-mail notification; Sep. 22, 2009; Database: ip.com; ip.com No. IPCOM000188083D; whole document (2 pages).

* cited by examiner

SYSTEM, METHOD AND COMPUTER PROGRAM PRODUCT TO EXTRACT INFORMATION FROM EMAIL COMMUNICATIONS

TECHNICAL FIELD

The embodiments of this invention relate generally to data processing systems, methods and computer program product that receive and process electronic communications such as electronic mail (Email).

BACKGROUND

The ability to access and transfer information has grown, and can be expected to grow, exponentially. One significant challenge that results from having access to a large volume of data concerns an ability to organize and locate data when it is needed. Some tools that can facilitate this activity include web search engines and databases that enable a user to organize data in such a way as to make keyword searches fast and highly successful. These tools are very effective for static documents which can be organized and categorized over time. However, one area that still largely requires manual operations is real time communications, such as electronic mail (email), instant messaging (IM), and social networks. These communication techniques enable the transfer of information between two, several, tens or hundreds of people with a simple click of a button. Unfortunately, using the transferred information still relies on the person receiving the information to manually review the information to discern important data, instructions and requests from less important or even unimportant information.

SUMMARY

In accordance with a non-limiting aspect of this invention there is provided a method that comprises storing as communications data at least a portion of received electronic communications of interest to user; processing the stored communications data to identify at least one action item that pertains to the user; storing results o f the processing including text descriptive of the at least one identified action item in a results repository; and outputting stored results in the results repository to a user device for review by the user.

In accordance with another non-limiting aspect of this invention there is provided a computer program product comprised of software instructions on a computer-readable medium. Execution of the software instructions using a computer results in performing operations that comprise storing as communications data at least a portion of received electronic communications of interest to user; processing the stored communications data to identify at least one action item that pertains to the user; storing results of the processing including text descriptive of the at least one identified action item in a results repository; and outputting stored results in the results repository to a user device for review by the user.

In accordance with yet another non-limiting aspect of this invention there is provided a system comprised of at least one data processor connected with at least one memory that stores software instructions. In the system the execution of the software instructions by the at least one data processor causes the system to store as communications data at least a portion of received electronic communications of interest to user; to process the stored communications data to identify at least one action item that pertains to the user; to store results of the processing including text descriptive of the at least one identified action item in a results repository; and to output, via at least one of a pull interface and a push interface, stored results in the results repository to a user device for review by the user.

DETAILED DESCRIPTION

Email is an example of an electronic communication which, if not used carefully, can inundate a receiving person with enormous volumes of information thereby adversely impacting the receiving person's productivity and effectiveness, and can create a situation where some vital information is not received and/or is not recognized as being of importance to the receiver. In the workplace today email threads, where exchanges can take place over time between any numbers of participants, lead to large amounts of data requiring review. Information, tasks and/or questions addressed to any specific person or people require that person to review the data to find that information. This can be especially challenging in the event that a person is suddenly given a request for some certain information when up until that point the person was not actively involved in the conversation.

Another specific area of concern relates to reading long emails or large email threads on hand-held devices such as mobile phones (e.g., 'smartphones') and tablet-type devices. In these cases it is especially easy to lose track of conversations, or miss important pieces o f information. This situation is compounded when a user has multiple email accounts.

One potential partial solution to these problems involves manually emphasizing some portion of the data, such as by highlighting, bolding, or underlining text in an email, writing the person's name in the subject line, or sending a second email to inform the person that there are pending actions. Drawbacks of these techniques can include requiring additional and consistent effort on the part of the sender. Furthermore, and in the case of emphasizing text, the receiving person is required to actually open and review the text.

Another potential partial solution to these problems involves those applications that provide public to-do lists, such as project management software. However, this approach currently relies on manual entry, and furthermore is not linked to the conversation thread.

In accordance with examples of the embodiments of this invention there is provided a system that includes an extraction engine that operates on data sources and electronic communications, for example on email, and which interprets communication text to identify actions and/or to-dos required by a person or by a team of people. The extraction engine operates with some type of communication text filter or filters, for example, a set of rules, key phrases and/or a user profile (user-related data/parameters) to improve that user's or that group's ability to take action on received information. Inputs for the extraction engine and related system components can be, as non-limiting examples, emails, IMs, virtual team-rooms and collaboration groups and/or social networks. Outputs that are generated automatically and without action by a person can include, for example, viewing highlighting (e.g., inbox, dashboards), report generation, form highlighting (e.g., highlighting specific sections in emails or documents), and/or organization of received data or some subset of received data into folders, team-rooms and/or networks. The embodiments of this invention provide an automated solution to facilitate access to information.

Disclosed herein is a system, method and computer program product which analyzes electronic communications (e.g. email, text, social networks) to identify important requests, to-dos and pieces of information and that makes this information more readily accessible to the person that they are directed to (to the addressee). In an embodiment an analysis engine analyzes emails as they enter an inbox searching for items addressed specifically to the user. The engine then acts on the received information in order to facilitate the process of the addressee seeing and responding to the received information. An action or a set of actions performed by the engine can be user-defined. An action or a set of actions performed by the engine can also be based on a system-level evaluation of a currently most optimum way to reach the addressee. Combinations of these and other actions are also made possible. For example, in a string or thread of emails a comment is inserted into one particular email: "Joe, can you please send me the contract for the Acme account." In this case the engine analyzes the email and searches for a number of items. For example, the engine searches for the user's name, although this will not necessarily exclude action if no name is present. The engine can also search for a set of keywords which indicate that some action needed, for example the phrase "can you . . . ", "would you . . . ", "I need . . . ", "please . . . ." If the purpose of the email is to provide information the engine can search for keywords such as "For your information . . . ", "Per your request . . . ", "Here is the data you requested . . . ". The engine then takes some action or actions on that information based on the user profile, and possibly also on knowledge of the best way to reach the user at that time. These engine-related actions could include, as non-limiting examples, highlighting the action item phrase within the email text, altering the subject of the email to indicate the action or information and/or attaching a predetermined symbol or graphical element to the email that represents an action or information. The engine can also transfer that information outside of the email system to further improve access to the information, as well as to perform further notification and organization, such as sending it to an IM system, text, or a social network. The choice of where to send the information can be based on an explicit indication given by the user and/or on a system analysis of the person's whereabouts based on, for example, user context/presence information such as that available from a mobile communication system. For example, if a person is available on IM the system can send the message to the person via IM. If the person is known to be traveling (for example, based on the person's calendar or on an "away" setting) the system can send a text. The system can, in some embodiments, take into account an urgency setting of the email so as to determine what action is best to take. In one example, assume that a user Joe receives an urgent email from Jane requesting the Acme contract and that Joe is not currently available on IM where he is usually available. The system can then look for Joe on some other communication system or platform, such as on an intranet communication system associated with an enterprise that Joe is associated with. If the user Joe cannot be found there either (e.g., he is not currently logged on) the system can have access to Joe's calendar application and determine that Joe is scheduled to be traveling. The system can then determine that, at present, the best way to reach Joe is by sending a text message to his mobile device (e.g., cell phone): "Urgent request from Jane Smith: Please send me the contract for the Acme account." In some embodiments the system could call Joe's phone and alert Joe to the received communication using a voice synthesis approach.

Figure 1:
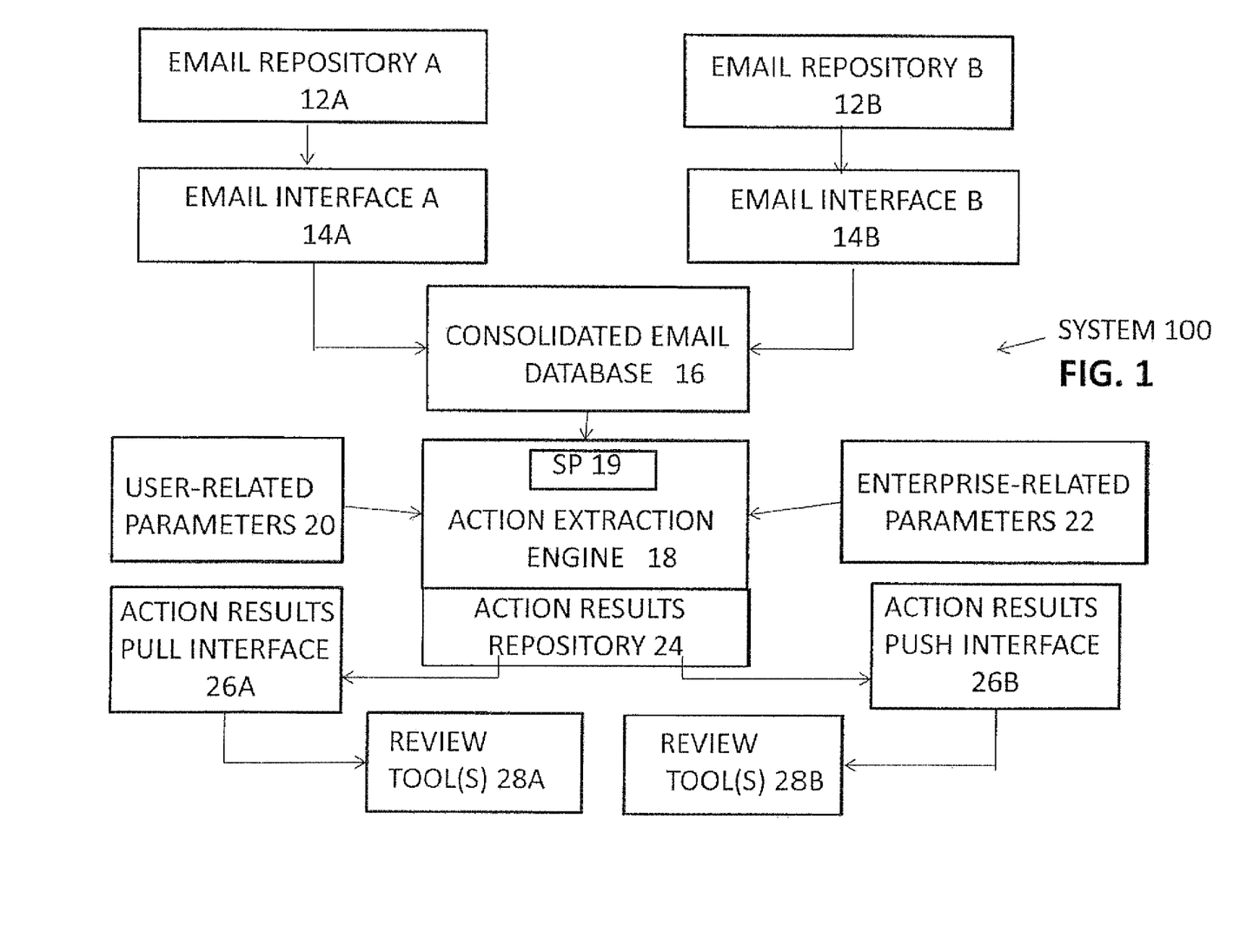
FIG. 1 is a block diagram and a signal flow diagram of a system that can embody the electronic message extraction teachings of this invention.

FIG. 1 shows a non-limiting embodiment of a system 100 in accordance with the teachings of this invention. In the ensuing description it will be assumed for convenience that the system 100 is associated with an enterprise. The system 100 can thus be instantiated at an enterprise such as, but not limited to, a public company, a private company, a for-profit or a not-for-profit organization, or a governmental agency. In some embodiments the system 100 can be instantiated as software that runs on a computer of the enterprise, while in other embodiments the system 100 can be implemented in whole or in part in a cloud computing environment on at least one virtual machine.

In other embodiments the system 100 could be associated with but a single user, or with a group of users such as a family.

The system 100 includes, in accordance with embodiments of this invention, an action extraction engine 18 and an action results repository 24. The action extraction engine 18 receives input from at least one source of user electronic communications via an appropriate interface. In FIG. 1 there are two sources of user communication and interfaces shown, designated email repository A 12A, email interface A 14A, email repository B 12B and email interface B 14B. In other embodiments there could be more than two sources of user communication. In other embodiments of the invention one or more of the sources of user Communication could be, for example, an IM source. In other embodiments of the invention one or more of the sources of user communication could be, for example, associated with a social network. The email repositories 12A, 12B can be associated with any type of third party email providers and/or enterprise-specific email providers, and the associated email interfaces 14A, 14B are assumed to be compatible and to provide connectivity.

In FIG. 1 the action extraction engine 18 is connected with and coupled to the email interfaces 14A, 14B via a consolidated email database 16 that provides a single accumulator of email messages addressed to a particular user. Note that if there is only one source of user electronic communication, e.g., one email repository and associated email provider, then the consolidated email database 16 may not be present or, if present, can be bypassed.

Connected with the action extraction engine 18 can be a user-related parameters function 20. The user-related parameters function 20 can include user-specific data such as, for example, a user's calendar/schedule application. The user-specific data could also be, in some embodiments of the invention, rules established by the user, e.g., "all emails from Sarah have high priority" or "all emails that mention Acme Corp have high priority".

Also connected with the action extraction engine 18 can be an enterprise-related parameters function 22. The enterprise-related parameters function 22 can include enterprise-specific data such as, for example, one or more organizational charts showing a hierarchy of relationships between persons in the enterprise that can be originators and/or co-recipients of emails that are addressed to the user.

The output of the action extraction engine 18 is sent to the action results repository 24 that in turn provides user-related communication outputs to at least one user interface. It can be noted that the action results repository 24 could in some embodiments be considered as, and implemented with, a text-type data buffer configured to store the output of the action extraction engine 18. In some embodiments the text buffer could be integrated with the action extraction engine 18. In some embodiments the results repository 24 can include electronic communication text that is highlighted, and/or that has the subject modified, and/or that in some way modifies and/or re-organizes the user's electronic communication inbox.

In the embodiment shown in FIG. 1 there are two user interfaces designated as an action results pull interface 26A and an action results push interface 26B. These in turn are coupled with user review tools 28A, 28B whereby the user can at least view the results of the operation of the action extraction engine 28. The user review tools 28A, 28B can be embodied in any suitable system(s) such as a PC, tablet or a smartphone. In some embodiments a single user review tool may be used with both the action results pull interface 26A and the action results push interface 26B.

Discussing FIG. 1 now in further detail, the email repositories 12A and 12B can be, for example, web-based or client-server applications. For each email repository 12A, 12B there is the corresponding interface 14A, 14B that is configured to extract raw email text information out of the associated email repository. In some cases the interface computer code can be based in whole or in part on software that currently exists. Each interface 14A, 14B continuously polls for the arrival of a new email in its corresponding repository 12A, 12B. When a new email is detected, at least the text portion of the email is extracted and written without change to the consolidated email database 16. The consolidated email database 16 retains a label of the source repository 12A, 12B for each email extracted so that the user can know the source of each extracted action.

The action extraction engine 18 analyzes the data present in the consolidated email database 16 using at least one filter to locate action items intended for the user of the system 100. The action extraction engine 18 can periodically poll the consolidated email database 16 to locate newly stored email text or it can be triggered by the arrival of new email text in the consolidated email database 16 to retrieve the newly arrived text. The action extraction engine 18 can include a semantic parser (SP) 19 that analyzes the email text input from the consolidated email database 16. The action extraction engine 18 attempts to extract only those actions that are intended for the user. Techniques to extract actions from email text can include the use of a (text) filter or filters that can include, but are not limited to:
 (a) looking for action-related phrases such as: "please do xxx" or "when can you have xxx done";
 (b) looking for lists of action items prefaced with typical terms such as: "action items:" or "AI:";
 (c) accepting input from the system user, such as via the user-related parameters 20, to teach the extraction engine 18 action-related phrases that the user can typically see or is most interested in;
 (d) taking into account the sender of the email, as well as other persons/entities listed in the TO: and CC: fields to determine urgency and action(s) required, this can be done in cooperation with data obtained from the enterprise-related parameters 22 and/or with data obtained from the user-related parameters 20 such as a user address book/contacts list;
 (e) ranking detected actions by priority and/or providing a score based on criteria set by the user, such as from the user's management chain and/or based on profile settings.

The action extraction engine 18 writes the results of the action analysis to the action results repository 24. Various items of meta-data can be stored together with extracted actions, including but not limited to:
 (a) the action due date and time;
 (b) the email From person, To list, CC list and BCC list;
 (c) the date and time the email was sent;
 (d) the name of the email repository 12A, 12B where the email was found;
 (e) additional names referenced in the email related to the action;
 (f) optional surrounding text to provide context for the action (an amount of surrounding text maybe a parameter set by the user); and
 (g) an optional "hot link" to the original email in the email repository 12A, 12B enabling the user to quickly access the original email as received.

As was noted above, the action extraction engine 18 can also take inputs from other data sources to optimize action extraction algorithms. One non-limiting example is the enterprise-related parameters 22, where the action extraction engine 18 algorithm can compare the person in the FROM: field and the persons listed in the TO: field to an organizational chart. The persons listed in the relevant positions in the organizational chart can facilitate action extraction since actions are typically assigned by more senior level people to more junior level people.

The action extraction engine 18 can also accept inputs from the end user, for example an email send date range of interest, a preferred email sender, etc. This information can be included in the user-related parameters 20.

The contents of the action results repository 24 are formatted in such a manner that facilitates the review of the results by the end user. Two entities interact with the action results repository 24 to allow the end user to view the data: 1) the action results pull interface 26A, and 2) the action results push interface 26B. The action results pull interface 26A is provided for those action review tools 28A that have sufficient embedded intelligence that they can actively pull data from various repositories. Examples include smartphones that are running applications and web sites configured to query the action results repository 24. The action results push interface 26B can be provided for those action review tools 28B that do not have the capability to pull from other databases, for example email clients and social networking software. In some embodiments both the action pull review tool 28A and the action push review tool 28B could be embodied on the same user device.

In one example embodiment only one email repository 12 is present and the system user wishes to receive one summary email that lists the recent actions extracted from all of the recent email in the repository so that the user can identify those actions that are coming due. This single summary email enables the end user to rapidly scan for potential actions, see highlighted email text around the detected action text, and easily jump to the email in question using a hotlink embedded in the summary email if the user desires to read the entire message.

In a further embodiment the system 100 can provide an ability to organize and prioritize the order of an email inbox based on the importance of the email as a function of the relevance of the email to the user from, for example, (a) Action Required to (b) Important Information to (c) FYI.

An additional embodiment of this invention provides an ability for the system 100 to learn from the actions of the user. For example, the user can input action "keywords" via the user-related parameters 20 that are based on the user's area of responsibility and/or those people that most often ask the user for approvals/action. As one non-limiting example the user can, via a user interface, highlight keywords and press a button that adds the highlighted keywords to their user profile.

In addition, the action extraction engine 18 can itself detect potentially important topics, such as those topics mentioned frequently in a subject line or elsewhere in some number of emails in some period of time, and then prompt the user to indicate whether the detected potential topics should be added to the user profile that forms a part of the user-related parameters 20. Such a potential 'topic' can be considered as a system 100 derived 'keyword'.

In addition, the user profile that forms a part of the user-related parameters 20 can include time frames, such as a date or dates associated with a project having a deadline or deadlines, so that electronic communications (e.g., emails) that are (potentially) relevant to such a project can be considered as being relevant (at least) until the expiration of the deadline. A scheduled end to a project of interest to the user, e.g., a deadline date, can be input by the user into a date field and included in the user profile in the user-related parameters 20 and associated with a name of a project (e.g., 'ACME Contract, complete by Jan. 11, 2015').

The user's profile can be dynamic such that important topics of the month, day or week can be updated so that currently 'hot topics' are most accessible. For example, "Project A" could currently be the hottest topic, "Project B" the second hottest topic, and so forth. This can apply as well to prioritizing by importance certain contacts such as customers and managers.

Related to this embodiment of the invention the action extraction engine 18 can itself heuristically detect priorities associated with certain emails. As one non-limiting example, assume that during an n day period the action extraction engine 18 detects that the phrase "New Project ABC" occurs in the Subject line of at least in emails, where the values of one or both of n and/or m can be user-defined and stored as part of the user-related parameters 20. In this case all such emails can be flagged as being important to the user, whether a specific user action item is found or not. In addition, a threshold for what constitutes a user 'action item' can be lowered. For example, even an email tagged as for your information or 'FYI', but having the phrase "New Project ABC" as the Subject, can be flagged to the user as if it included an identified user action item such as 'Please Respond Immediately'. Further, it should be noted that a designation of 'FYI' could actually be relevant to some other recipient of the email, and not the user per se, but the Subject: "New Project ABC" may be of particular interest to the user. As but one example, a project manager may be interested in all electronic communications that reference "New Project ABC", and all such electronic communications (e.g., emails) may be considered by the system 100 as including an Action Item relevant to the project management user.

In yet another embodiment of this invention the action extraction engine 18 is configured to create a link from a filter, e.g., from a phrase, that the action extraction engine 18 used to determine the importance of information. If the user desires to change the way the action extraction engine 18 uses the filter such as keywords the user can click the link which will take the user to the user's action extraction profile. The user's profile can be included in whole or in part in the user-related parameters 20, or it can be included in whole or in part a component of the action extraction engine 18. Once the profile is presented the user can be given the opportunity to adjust how the action extraction engine 18 should use that selection in the future. For example, if the action extraction engine 18 misinterpreted a keyword, the user can make an adjustment to say, e.g., "Don't take that action again for this keyword." Similarly, the user can increase (or reduce) the priority for a given keyword.

An aspect of the embodiments of this invention relates to managing security. In a case where emails are transferred to an external repository, such as a social network, an ability is provided to give appropriate people access to that information. This can be accomplished based on those persons copied on the email. This can also be accomplished based on user groups defined in a user profile that forms a part of the user-related parameters 20. If an email is tagged to be shared with a group in a social network, those users would all have access to that information in the social network. If a response or action is required then any member of that group can respond, and the other members of the group are notified by the action extraction engine 18 that the item is closed.

An additional embodiment related to security is a function of the action extraction engine 18 that recognizes certain people or groups in the user profile as automatically having access to the user's information. One example is that the user's assistant, who may be explicitly identified by the user in the user-related parameters 20, or identified by the action extraction engine 18 from the enterprise-related parameters 22 (e.g., from an organization chart of the enterprise), can be given access to the user's action results repository 24. Furthermore, the user's profile can be set up in a way that certain emails automatically go to the user's assistant. For example, if the semantic parser 19 detects in an email the phrase "Please schedule a meeting", a copy of the email can be automatically copied to or forwarded to the assistant, or again the assistant could be automatically be granted security access in the social network.

It should thus be realized that, as considered with respect to the examples of the embodiments of this invention, an 'Action Item' may be identified explicitly by the user, or it could be implicitly identified by the system 100. An 'Action Item' can represent some data, or information, or some message that the user is expected to or wishes to respond to immediately, or that the user may respond to, or it could be some data, or information, or some message that the user may find of interest and that may or may not elicit a response from the user, at least not immediately. A particular 'Action Item' that is identified by the system 100 and informed to the user may need to be considered in the context of one or more other 'Action Items' to determine whether or not a response by the user is needed or appropriate.

Figure 2:
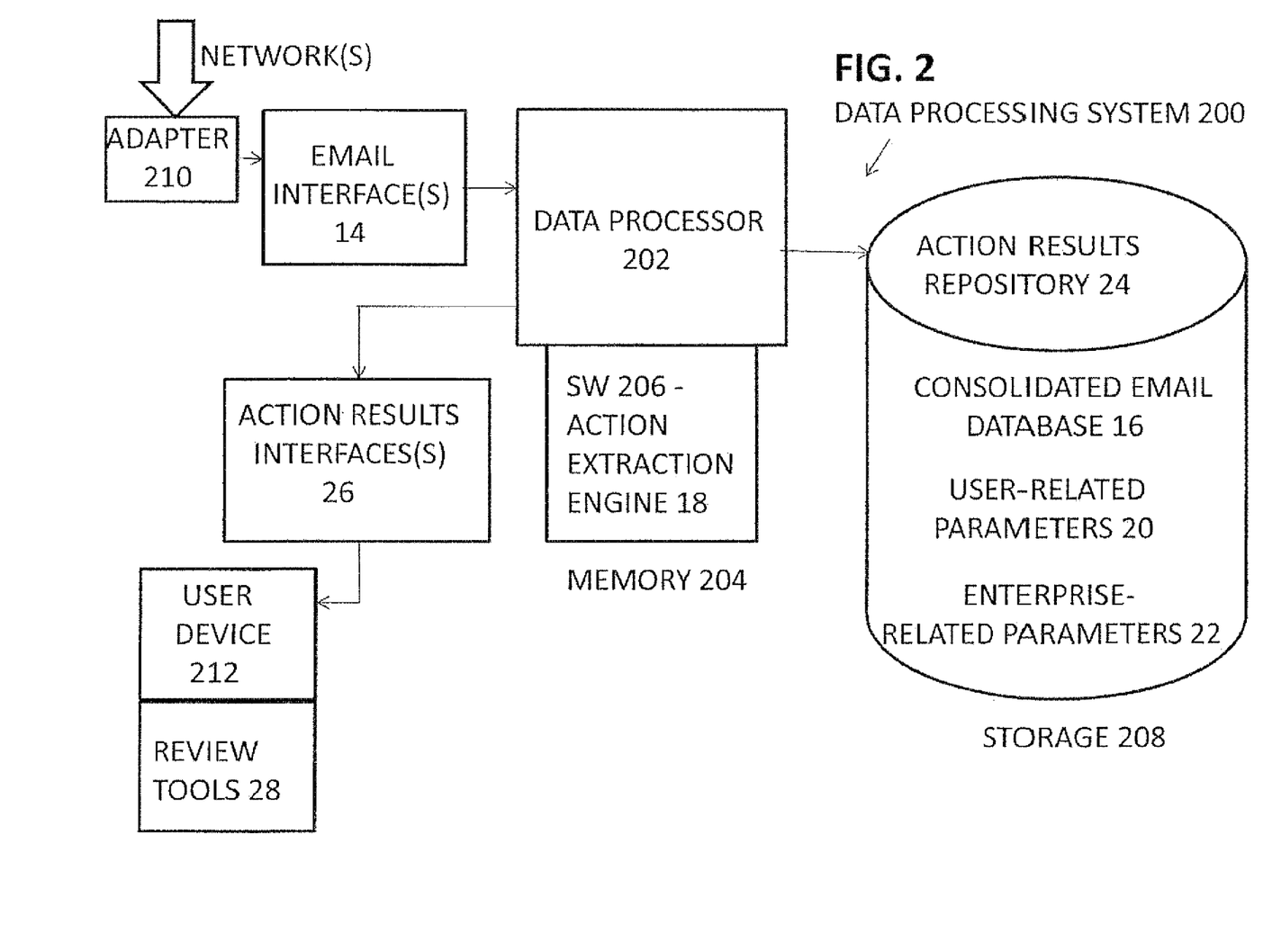
FIG. 2 presents a non-limiting example o f an embodiment of a data processing system can be used to realize one or more of the components of the system shown in FIG. 1.

FIG. 2 shows a non-limiting example of an embodiment of a computer or data processing system 200 that can be used to realize one or more of the components of the system 100 shown in FIG. 1. The data processing system 200 includes at least one data processor 202 connected with at least one computer-readable medium such as a memory 204 that stores computer readable program instructions (software (SW 206)) configured to perform all or some of the various operations described above. For example, the computer readable program instructions 206 can be configured to execute the functionality of the action extraction engine 18 and can be connected with a user device 212 via the action results interface(s) 26 and a suitable device communication interface that can include one or both of a wired interface and a wireless interface (e.g., an optical and/or a radio frequency (RF) interface). The device communication interface can be considered in some embodiments to form a part of an enterprise intranet (e.g., a LAN or WLAN) but can also include an ability to connect to a wide area network (WAN) such as the internet. The user device 212 can in some embodiments host application software that implements one or both of the pull and push review tools 28A, 28B, and is assumed to include some type of user interface through which the user is enabled to review the electronic communications of interest to the user as processed by the action extraction engine 18 and related components as was described above.

At least one data storage 208 is connected with the data processor 202 and can be configured to include the consolidated email database 16, some or all of the user-related parameters 20, some or all of the enterprise-related parameters 22 and the action results repository 24. In some embodiments the computer readable program instructions 206 could also be resident in the storage 208. In some embodiments some or all of the user-related parameters 20 and/or some or all of the enterprise-related parameters 22 can be obtained from applicable servers as needed via a network connection, such as a LAN, WLAN or WAN, and thus may not be resident in the data storage 208. The data processor 202 is also connected with the email interface(s) 14 that in turn are connected, via a suitable communications adapter 210 (LAN, WLAN, WAN), to a network or networks through which the email repository or repositories 12 are accessed.

If the functionality of the action extraction engine 18 is not included in the local SW 206 it could be resident in a separate processor or system or sub-system that is co-located with the data processor 202, or that is located remotely from data processor 202 and connected via one or more suitable interface(s).

In some non-limiting embodiments the functionality of the action extraction engine 18 and related components could be implemented as a service that is subscribed to by the enterprise or by the user.

In some embodiments the data processing system 200 can be physically located and instantiated at an enterprise, while in some other embodiments some or all of the data processing system 200 and related modules and sub-systems and memories (e.g., storage 208) can be implemented as a virtual system or systems hosted in the cloud either by the enterprise itself or by a third party cloud provider.

It should thus be realized that, and in general, any computer program product that implements the embodiments of this invention including, but not limited to, the action extraction engine 18 can be embodied on the same platform, or the computer program product and the action extraction engine 18 can be embodied on different platforms, where the platform or platforms can comprise one or both of a hardware instantiation or a virtual, cloud-based instantiation.

This use of the various embodiments of this invention facilitates efficiency by making important information more accessible to a user. The various embodiments of this invention can be especially useful in mobile communications, where examining large volumes of data is more difficult based at least on the more limited user interface available to the user. The various embodiments of this invention can also be especially useful in social networks.

Figure 3:
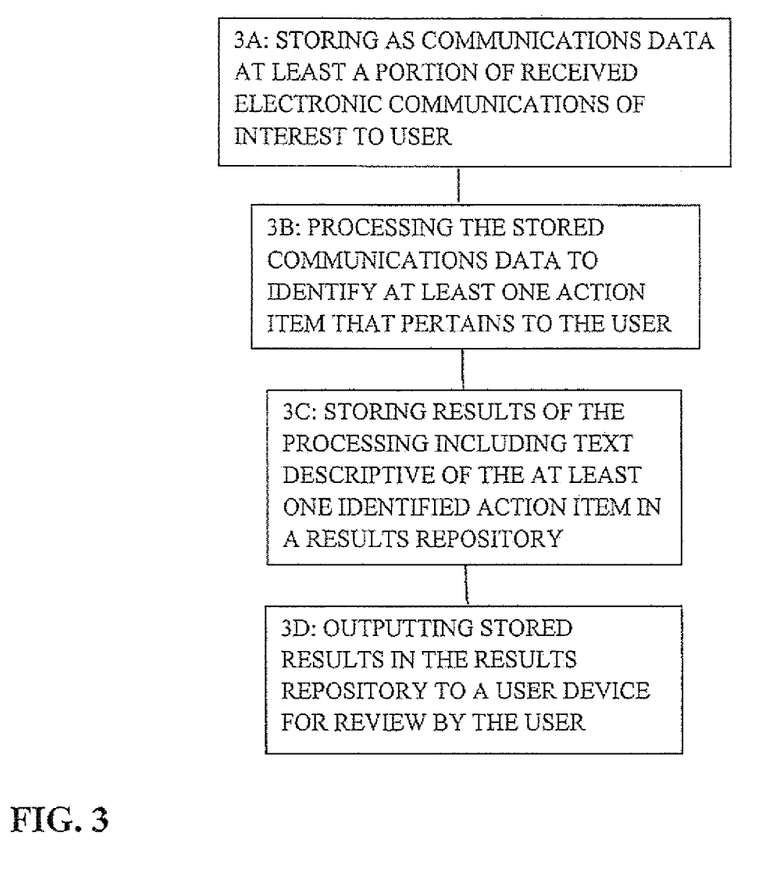
FIG. 3 illustrates a logic flow diagram (flow chart) in accordance with an example of an embodiment of a method of this invention, as well as a result of execution of computer software in accordance with embodiments of this invention.

Referring to FIG. 3, in one aspect thereof the embodiments of this invention provide a method, implemented by at least one data processor, that comprises (Block 3A) storing as communications data at least a portion of received electronic communications of interest to user; (Block 3B) processing the stored communications data to identify at least one action item that pertains to the user; (Block 3C) storing results of the processing including text descriptive of the at least one identified action item in a results repository; and (Block 3D) outputting stored results in the results repository to a user device for review by the user.

In the method of FIG. 3, a received electronic communication can be identified as being of interest to the user if the user is listed as an addressee of the electronic communication, and where the stored communications data comprises at least a text portion of an identified electronic communication.

In the method of FIG. 3, where the processing can comprise analyzing the stored communications data in conjunction with at least one of user-related parameters and enterprise-related parameters.

In the method of FIG. 3, where the processing can comprise extracting text identified as representing an action item, emphasizing the extracted text, and including additional text from the electronic communication having the action item to provide context for the text identified as representing the action item.

In the method of FIG. 3, where the outputting step comprises sending the stored results to the user device via at least one of a pull interface and a push interface.

In the method of FIG. 3, where processing comprises analyzing the stored communications data in conjunction with user-related parameters, where the user has access to a plurality of user devices, and where outputting comprises determining based at least on the user-related parameters to which one of the plurality of user devices the stored results are sent.

In the method of FIG. 3, where the stored results comprise an inserted link to a received electronic communication that contains an identified action item.

In the method of FIG. 3, where the processing uses at least one filter to identify an action item, and where the stored results comprise an inserted link that points to a filter that resulted in identifying an action item, and where the user is enabled to modify the filter pointed to by the link.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, other types of electronic communications, e.g., other than email per se and/or IM per se, may be used by those skilled in the art. However, all such and similar modifications of the teachings of this invention will still fall within the scope of this invention.

What is claimed is:

1. A computer executed method, comprising:
processing electronic mail communications data to identify at least one action item that pertains to a user;
storing results of the processing including the at least one identified action item; and
outputting stored results to a user device for review by the user;
wherein the processing uses at least one filter to determine importance of information contained in the stored electronic mail communications data and processing comprises analyzing the stored electronic mail communications data in conjunction with user-related parameters indicating at least priority, from which the importance is determined at least in part, associated with electronic mail contained in the stored electronic mail communications data,
wherein the at least one filter is used to identify a presence of the at least one identified action item contained in the stored electronic mail communications data and determined to be important,
wherein the user has access to a plurality of user devices,
wherein the outputting comprises determining, based at least on user-related parameters from a calendar application, to which one of the plurality of user devices associated with the user the stored results are to be sent, and sending the stored results, comprising indication of the at least one identified action item based on the stored electronic mail communications data, to the determined one of the plurality of user devices at least by sending the stored results outside an electronic mail system toward the determined one of the plurality of user devices, and wherein the stored results are sent via a social network.

2. The method as in claim 1, where a received electronic communication is identified as being of interest to the user if the user is listed as an addressee of the electronic communication, and where the stored electronic mail communications data comprises at least a text portion of an identified electronic communication.

3. The method of claim 1, where the processing comprises analyzing the stored electronic mail communications data in conjunction with both the user-related parameters and enterprise-related parameters.

4. The method as in claim 1, where the processing comprises extracting text identified as representing an action item, emphasizing the extracted text, and including additional text from the electronic communication having the action item to provide context for the text identified as representing the at least one identified action item, and sending as at least part of the stored results the emphasized extracted text and the additional text to the user device.

5. The method as in claim 1, where the outputting comprises sending the stored results to the user device via at least one of a pull interface or a push interface.

6. The method as in claim 1, where the stored results comprise a summary email that lists actions extracted from a plurality of electronic mail so that the user can identify those actions that are coming due, wherein the summary email comprises an inserted link to a received electronic mail communication from the plurality of electronic mail that contains the at least one identified action item.

7. The method of claim 1, wherein the outputting further comprises determining an urgency setting of the at least one action item, and wherein the determining to which one of the plurality of user devices associated with the user the stored results are to be sent is performed in response to the urgency setting of the at least one action item is determined as being urgent.

8. The method of claim 7, wherein the outputting further comprises determining whether the user is determined to be traveling, and wherein the determining to which one of the plurality of user devices associated with the user the stored results are to be sent is performed in response to both the user is determined to be traveling and the urgency setting of the at least one action item is determined as being urgent.

9. The method of claim 1, wherein electronic mail in the received electronic mail communications of interest to the user is tagged to be shared with a group in a social network, and wherein sending the stored results to the social network comprises indicating to the social network that users in the group are allowed to have access to the electronic mail in the stored results that were sent to the social network.

10. The method of claim 9, further comprising, in response to a member of the group responding to the electronic mail in the stored results that were sent to the social network, notifying via the social network the other members in the group that the electronic mail is closed for response.

11. The method of claim 1, further comprising determining an assistant of the user is explicitly identified by the user in one of the user-related parameters or enterprise-related parameters, and informing the social network the assistant should be granted security access to information in the social network from the user.

12. The method of claim 1, wherein processing further comprises heuristically detecting priorities associated with certain electronic mail, at least by determining a phrase occurs a first user-defined number of times in the certain electronic mail over a second user-defined number of days, and highlighting the certain electronic mail as being important to the user, and wherein the outputting comprises outputting indications of the highlighted certain electronic mail to the determined one of the plurality of user devices.

13. The method of claim 1, wherein the processing, storing, and outputting are performed without action by the user.

14. The method of claim 1, wherein the processing comprises detecting the priority associated with electronic mail contained in the stored electronic mail communications data based on a first plurality of emails comprising a phrase being detected over a second plurality days and determining the corresponding phrase is important based on numbers of the first and second pluralities meeting corresponding thresholds.

15. A computer program product comprised of software instructions embodied on a non-transitory computer-readable medium, where execution of the software instructions using a computer results in performing operations comprising:
processing electronic mail communications data to identify at least one action item that pertains to a user;

storing results of the processing including the at least one identified action item; and outputting stored results to a user device for review by the user;

wherein the processing uses at least one filter to determine importance of information contained in the stored electronic mail communications data and processing comprises analyzing the stored electronic mail communications data in conjunction with user-related parameters indicating at least priority, from which the importance is determined at least in part, associated with electronic mail contained in the stored electronic mail communications data, wherein the at least one filter is used to identify a presence of the at least one identified action item contained in the stored electronic mail communications data and determined to be important, wherein the user has access to a plurality of user devices, and wherein the outputting comprises determining, based at least on user-related parameters from a calendar application, to which one of the plurality of user devices associated with the user the stored results are to be sent, and sending the stored results, comprising indication of the at least one identified action item based on the stored electronic mail communications data, to the determined one of the plurality of user devices at least by sending the stored results outside an electronic mail system toward the determined one of the plurality of user devices, and wherein the stored results are sent via a social network.

16. The computer program product as in claim 15, where the processing comprises extracting text identified as representing an action item, emphasizing the extracted text, and including additional text from the electronic communication having the action item to provide context for the text identified as representing the at least one identified action item, and sending as at least part of the stored results the emphasized extracted text and the additional text to the user device.

17. The computer program product as in claim 15, where the stored results comprise a summary email that lists actions extracted from a plurality of electronic mail so that the user can identify those actions that are coming due, wherein the summary email comprises an inserted link to a received electronic mail communication from the plurality of electronic mail that contains the at least one identified action item.

18. A system, comprised of at least one data processor connected with at least one memory that stores software instructions, where execution of the software instructions by the at least one data processor causes the system to:

process electronic mail communications data to identify at least one action item that pertains to a user;

store results of the processing including the at least one identified action item; and output stored results to a user device for review by the user;

wherein the stored electronic mail communication data is processed using at least one filter to determine importance of information contained in the stored electronic mail communications data and the stored electronic mail communications are analyzed in conjunction with user-related parameters indicating at least priority, from which the importance is determined at least in part, associated with electronic mail contained in the stored electronic mail communications data, wherein the at least one filter is used to identify a presence of the at least one identified action item contained in the stored electronic mail communications data and determined to be important, wherein the user has access to a plurality of user devices, and wherein the outputting comprises determining, based at least on user-related parameters from a calendar application, to which one of the plurality of user devices associated with the user the stored results are to be sent, and sending the stored results, comprising indication of the at least one identified action item based on the stored electronic mail communications data, to the determined one of the plurality of user devices at least by sending the stored results outside an electronic mail system toward the determined one of the plurality of user devices, and wherein the stored results are sent via a social network.

19. The system as in claim 18, where a received electronic communication is identified as being of interest to the user if the user is listed as an addressee of the electronic communication, and where the stored electronic mail communications data comprises at least a text portion of an identified electronic communication, where the stored electronic mail communications data is processed to analyze the stored electronic mail communications data in conjunction with both the user-related parameters and enterprise-related parameters and to extract text identified as representing the at least one identified action item, to emphasize the extracted text, and to include additional text from the electronic communication having the action item to provide context for the text identified as representing the at least one identified action item, and to send as at least part of the stored results the emphasized extracted text and the additional text to the user device.

20. The system of claim 18, where the stored results comprise a summary email that lists actions extracted from a plurality of electronic mail so that the user can identify those actions that are coming due, wherein the summary email comprises an inserted link, where the inserted link points to a received electronic communication from the plurality of electronic mail that contains the at least one identified action item.

* * * * *